R. D. REED.
NUT LOCK.
APPLICATION FILED MAR. 5, 1912.

1,049,765.

Patented Jan. 7, 1913.

Witnesses:

Inventor
Ray D. Reed
By his Attorneys

UNITED STATES PATENT OFFICE.

RAY D. REED, OF ALBUQUERQUE, NEW MEXICO.

NUT-LOCK.

1,049,765.  Specification of Letters Patent.  Patented Jan. 7, 1913.

Application filed March 5, 1912. Serial No. 681,779.

*To all whom it may concern:*

Be it known that I, RAY D. REED, a citizen of the United States, residing at Albuquerque, in the county of Bernalillo and State of New Mexico, have invented certain new and useful Improvements in Nut-Locks, of which the following is a full, clear, and exact description.

This invention relates to nut locks, the object of the same being to provide novel means whereby an interlocking action between the bolt and the nut thereon will be obtained which will increase as the nut is screwed to its seat.

The invention consists of a tapering ring adapted to be inserted between the nut and the part to be secured so that when the nut is screwed to its seat the inner periphery of the ring will be forced into locking engagement with the bolt.

It also consists in the combination of a bolt, a nut, and a part to be secured thereby, of a conical locking ring surrounding the bolt and located between the nut and part to be secured, and means for preventing the expansion of said ring whereby the inner periphery thereof will be forced into locking engagement with the bolt when the nut is screwed to its seat.

The invention also consists in certain features of construction which will be hereinafter more fully described and claimed.

Figure 1:
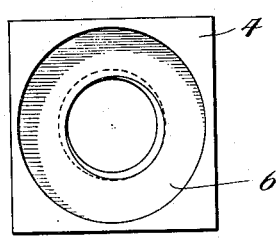
Figure 2:
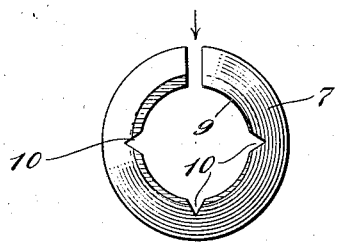
Figure 3:
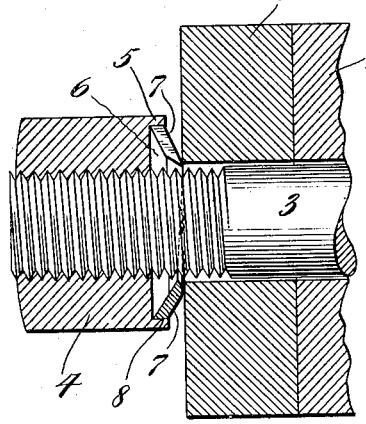
Figure 4:
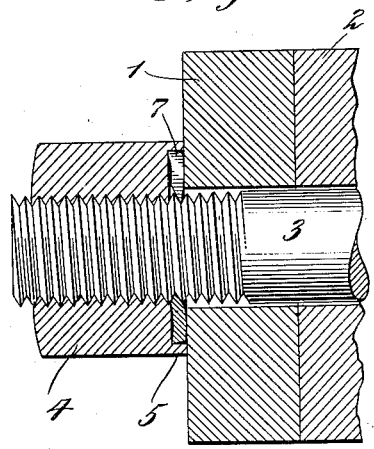
Figure 5:
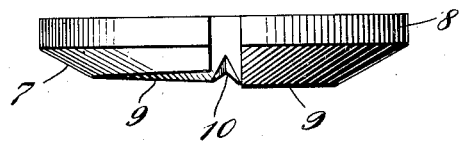

In the drawings: Figure 1 is a plan view of the inner face of a nut constructed in accordance with my invention. Fig. 2 is a plan view of my improved locking device. Fig. 3 is a view showing the parts in section assembled in unlocked engagement upon a bolt. Fig. 4 is a similar view showing the parts in locked relation, and Fig. 5 is an enlarged side elevation of my improved locking device, looking in the direction of the arrow in Fig. 2.

Referring to the drawings by numerals, 1 and 2 designate two elements to be bolted together; 3 designates a bolt and 4 a nut. This nut is provided with a shoulder or abutment 5, shown in the drawings as formed by the wall of a recess 6 in one face of the nut, surrounding the threaded bolt opening.

7 broadly designates my improved locking device which consists of a substantially conical, "split" washer or ring of steel or like flexible resilient material. The base 8 of this split ring is of such external circumference as to fit within the recess 6, while the inner periphery 9 thereof is of substantially the same diameter as the bolt opening. This inner edge or periphery is preferably sharp or tapering, and is also preferably cut upon a spiral of the same pitch as the threads of the bolt, so as to fit in the space between said threads when the device is in place. This construction is most clearly shown in Fig. 5. This inner edge or periphery of the ring 7 is provided with one or more V-shaped notches 10 which serve to increase the flexibility of the ring at this point for a purpose which will hereinafter appear. The number of notches employed is not essential, however, and they may be dispensed with altogether, if desired.

The parts are assembled as shown in Fig. 3, the base 8 of the ring being placed in the recess 6, against the abutment 5 and the nut and ring being turned up on the bolt 3, the thread 9 engaging the bolt between two of the threads thereon. When this inner edge or thread has been forced into firm engagement with the element 1, said element having meanwhile been brought into proper engagement with element 2, the ring will cease to turn with the nut and further turning up of the nut will gradually bend or arch the conical washer 7 transversely and move the edge 9 toward the nut until it assumes the position shown in Fig. 4. This flexure of the ring forces its outer periphery against the shoulder 5, and its inner periphery into close engagement with the bolt, thus securing a double locking action, the ring exerting a radial outward pressure upon the nut and a radial inward pressure on the bolt. This flattening of the ring, is facilitated by the split in the ring which allows a certain amount of free play of the ends thereof. The notches 10 reduce the rigidity of the inner edge of the ring and further facilitate the flattening out process.

It will be observed that as the inner periphery of the ring is forced toward the nut, the ring will be bowed transversely, to a greater or less extent, throughout its annular length. This provides a resilient engagement of the ring with the bolt and the shoulder on the nut, thereby obviating injury to the thread of the bolt, which would undoubtedly take place if the ring exerted a direct thrust against the bolt and flange.

While I have shown and described my locking ring as having a spiral inner periphery conforming to the threads of the bolt, it is obvious that this is not an essential feature, since the inner periphery might be given other forms by which a locking action of equal effectiveness might be secured, but any deviation from the spiral construction of the inner periphery would probably result in injury to the threads of the bolt.

It is of course not absolutely essential that the ring be split, since the notches in the inner periphery might alone be depended upon to give the ring sufficient flexibility, my invention residing in a substantially cone-shaped ring.

Having described my invention, I claim:

1. In a nut lock, the combination with a bolt and a member through which the bolt is adapted to pass, of a nut threaded on the bolt and adapted to be turned up against the member and having a recess in its inner face providing an annular abutment, a flexible conical washer slidably engaging over the bolt, the base of the washer extending into said recess and bearing against said abutment, the reduced end of the washer being adapted to engage the member and having a spiral thread-engaging edge, said washer being split whereby it is adapted to expand against said abutment when the nut is turned up against the member, said flexible washer being adapted to be bowed inwardly into the recess at its reduced end whereby the spiral thread-engaging edge thereof binds in the threads of the bolt.

2. In a nut lock, the combination with a bolt and a member through which the bolt is adapted to pass, of a nut threaded on the bolt and adapted to be turned upon the bolt against the member, said nut having a recess in its inner face and an abutment defining the recess, and a conical flexible split washer slidable upon the bolt and engaging at its base in the recess in the nut, the reduced end of said washer engaging said member about the bolt and having a spiral thread-engaging edge at its reduced end adapted to bind between the threads of the bolt immediately at the member and prevent the turning of the washer, the nut being adapted to be turned upon the bolt against said member whereby said washer is compressed, the base of the washer being adapted to expand against said abutment and the reduced end of the washer being adapted to be bowed inwardly into the recess as the nut approaches the member.

In witness whereof, I subscribe my signature, in the presence of two witnesses.

RAY D. REED.

Witnesses:
H. B. RAY,
WM. WATSON.